(12) United States Patent
Willey (10) Patent No.: US 6,254,166 B1
(45) Date of Patent: Jul. 3, 2001

(54) ADJUSTABLE, READILY REMOVABLE WINDSHIELD

(76) Inventor: Barry A. Willey, 727 Ela Rd., Inverness, IL (US) 60067

( * ) Notice: Subject to any disclaimer, the term of this patent is extended or adjusted under 35 U.S.C. 154(b) by 0 days.

(21) Appl. No.: 09/607,650

(22) Filed: Jun. 30, 2000

(51) Int. Cl.⁷ .................................................. B62L 17/04
(52) U.S. Cl. .................... 296/78.1; 296/77.1; 296/84.1; 296/96.11; 296/96.21; 296/84
(58) Field of Search .................. 296/78.1, 77.1, 296/84.1, 86.11, 96.21, 96.22, 201, 89

(56) References Cited

U.S. PATENT DOCUMENTS

| | | | |
|---|---|---|---|
| 4,082,345 | 4/1978 | Willey | 296/78.1 |
| 4,087,110 * | 5/1978 | Vetter | 296/78.1 X |
| 4,168,098 | 9/1979 | Willey | 296/78.1 |
| 4,379,584 | 4/1983 | Willey | 296/78.1 |
| 4,489,973 | 12/1984 | Willey | 296/78.1 |
| 4,606,571 * | 8/1986 | Fujita | 296/78.1 |
| 4,696,509 * | 9/1987 | Yagasaki et al. | 296/78.1 X |
| 4,707,017 * | 11/1987 | Minibe et al. | 296/78.1 |
| 4,830,423 * | 5/1989 | Nebu et al. | 296/78.1 |
| 5,658,035 | 8/1997 | Armstrong | 296/78.1 |
| 5,730,483 * | 3/1998 | Gregor | 296/78.1 |
| 5,732,965 | 3/1998 | Willey | 296/78.1 |
| 5,788,313 | 8/1998 | Willey | 296/78.1 |
| 5,845,955 | 12/1998 | Willey | 296/78.1 |
| 5,853,217 * | 12/1998 | Armstrong | 296/78.1 |
| 5,857,727 * | 1/1999 | Vetter | 296/78.1 |
| 5,954,385 * | 9/1999 | Moore et al. | 296/96.21 X |

FOREIGN PATENT DOCUMENTS

3700761 * 7/1987 (DE) .................................. 296/78.1

* cited by examiner

Primary Examiner—D. Glenn Dayoan
Assistant Examiner—Lori L. Coletta
(74) Attorney, Agent, or Firm—James T. FitzGibbon; Vedder, Price, Kaufman & Kammholz (57) ABSTRACT

A windshield assembly for a motorcycle. The shield includes a fixed portion and a movable portion. The movable portion moves within slots in the frame and the movable portion. A compressive force is releasably applied to hold the movable part in place, and to allow it to be moved. The assembly is held in place by mounting brackets which cooperate with locking brackets, and these attach to docking points on the cycle. The brackets or parts thereof may be frangible, wholly or in part.

19 Claims, 5 Drawing Sheets

ADJUSTABLE, READILY REMOVABLE WINDSHIELD

BACKGROUND OF THE INVENTION

The present invention relates to motorcycles, and more particularly, to a lockable, detachable motorcycle windshield, including a windshield having a height adjustment feature.

The use of motorcycle windshields is desirable and well known for long distance highway travel. Such a windshield, when properly placed on a motorcycle, minimizes exposure to windloading on the upper part of the body and consequent fatigue caused thereby. Accordingly, many riders require a windshield. However, when traveling strictly around town or for shorter trips, a motorcycle rider may not wish to have a windshield on the cycle. Because the attachment and removal of a windshield often involves a number of steps, even involving tools on occasion, such a permanent method of attachment is not necessarily desirable. It is likewise not desirable to have a windshield, which, once removed, leaves protruding or interfering attachment points on the cycle, thus creating an unsightly appearance and a possible injury hazard.

It is also desirable to create a windshield which has a height adjustment feature, particularly one which can be readily achieved. Thus, if it were possible to make a windshield vertically movable, this would be desirable. However, merely adjusting the screen higher or lower would also affect the bottom depth of the shield. Most windshields having an adjustable portion are not desirable for a number of reasons, including complexity, range of adjustment and wind leakage.

These also include an ability to maintain the vertical position of the adjustable portion in a number of different positions. A still further disadvantage is the need to control the adjustment mechanism, which often requires tools or the like to secure the adjustment. An additional disadvantage is one wherein the fastening means does not permit adjustment or allows adjustment with gaps or openings in the part of the shield once adjusted.

An advantageous windshield would be one providing a windshield mounting system which included a plurality of attachment points which are not unduly prominent with respect to the motorcycle being equipped, yet which would securely attach the shield assembly.

It is therefore an object of the invention to provide a motorcycle windshield which can be attached and detached by a simple action to a pair of attachment points on each side of the motorcycle.

Another object of the present invention is to provide a windshield which, with very little additional cost, may be locked in place once on the motorcycle.

Yet another object of the present invention is to provide a simple method of attaching the windshield, i.e., one which may be accomplished without tools of any kind.

A further object of the invention, in some cases, is to provide a windshield which will detach from the cycle, especially when the cycle is struck from the rear, in the event of a collision.

A still further object of the invention is to provide several different mechanisms for enabling the shield to detach.

Still another object of the present invention is to provide an attachment means which, once in place, is secure and cannot be detached while in a locked position.

A further object of the present invention is to provide a windshield mounting system wherein all the attachment parts are included on the windshield and wherein only the attachment points, which are relatively inconspicuous, can remain on the motorcycle.

A still further object of the invention is to provide a windshield which is vertically adjustable for height.

An additional object of the invention is to provide a simple, preferably a toggle-type, action, wherein an infinite number of adjustments may be achieved within given limits.

Another object of the present invention is to provide an adjustment feature wherein an overall length of effective clamping can be achieved by using only an opposed pair of fasteners, preferably square bodied fasteners actuated by a toggle.

Yet another object of the present invention is to provide a windshield which is otherwise imperforate but includes a pair of open slots therein for the adjustment mechanism.

The foregoing and other objects of the present invention may be achieved in practice by providing a readily removable windshield which includes a pair of attachment points on each side, which may be fitted by a simple snap-on action and which may thereafter be locked in place. Preferably, this may be accomplished by pairs of opposed, spring loaded holders for the attachment points to avoid any lateral movement and to provide a finished appearance in use.

In another aspect, the invention involves an adjustable height feature in the windshield which is achieved by entrapping the vertically movable panel between at least a fixed panel and front and rear surfaces of the apparatus, with a mechanism actuated by a simple toggle or the like for each side of the shield.

The exact manner in which these and other objects of the invention are achieved in practice will become more clearly apparent when reference is made to the accompanying drawings in which like reference numbers indicate corresponding parts throughout.

BRIEF DESCRIPTION OF THE DRAWINGS

FIG. 4 is a rear elevational view of the windshield assembly of FIG. 1; and, FIGS. 4a and 4b are enlarged side and end elevational views on an enlarged scale, with parts shown in phantom, showing the preferred locking mechanism of the invention.

DESCRIPTION OF THE PREFERRED EMBODIMENTS OF THE INVENTION

While the invention may be embodied in various forms and may be made from different materials, a preferred embodiment will be described wherein the shield is made from a polycarbonate or polymethylmethacrylate material and wherein the mounting system is made from metal, preferably steel, augmented with a suitable gasketing material.

Figure 1:
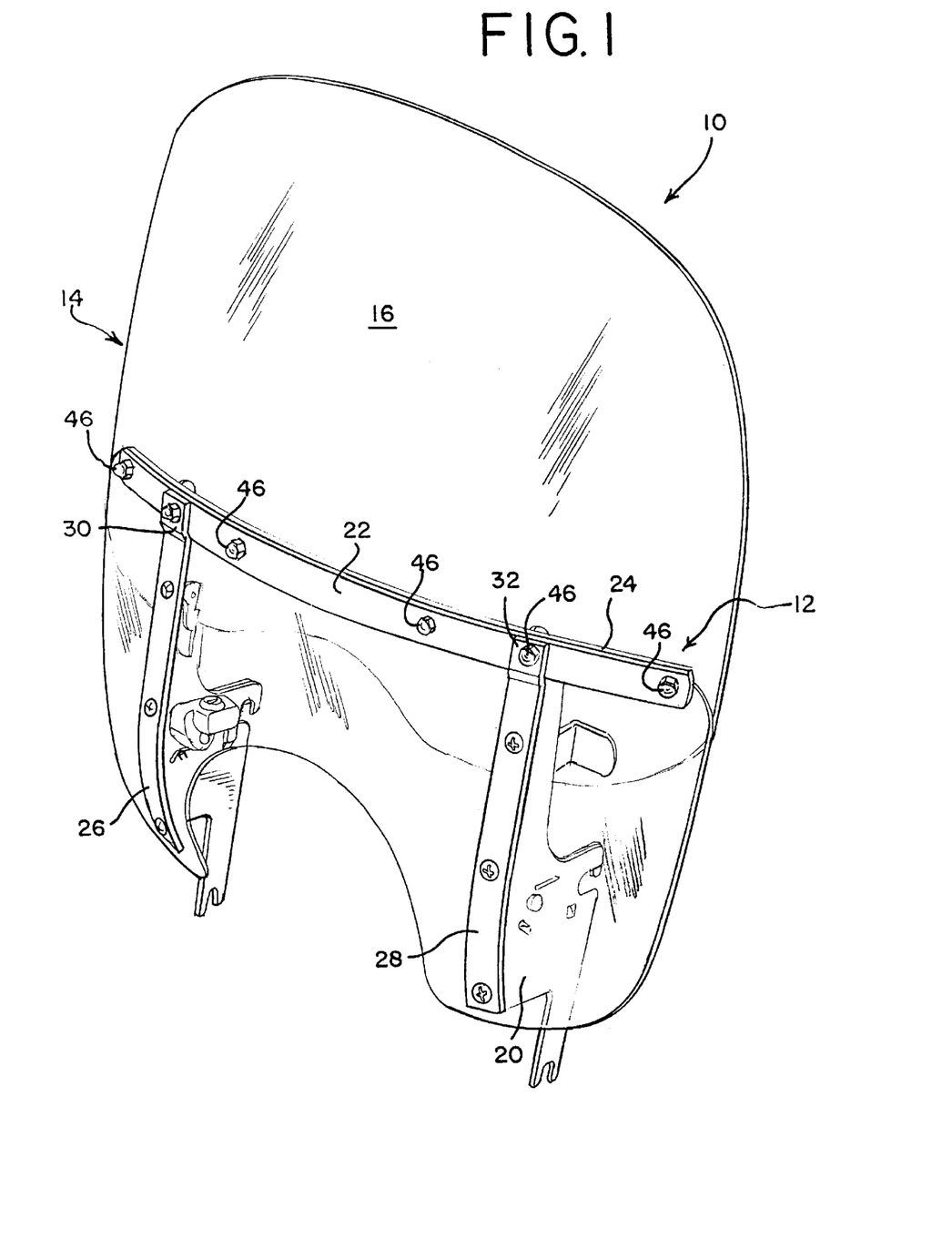
FIG. 1 is a perspective view of the adjustable, readily removable and lockable, height adjustable windshield of the invention.

Referring now to the drawings in greater detail in FIG. 1, there is shown a windshield assembly generally designated 10 which is held in place by a mounting frame assembly generally designated 12. The windshield 10 includes at least a pair 14 of separate panels to be described in detail. These panels include an upper, transparent panel 16, which includes a lower extension portion 18 that is in turn held in place by a mechanism to be described later. In addition, there is a preferably forwardly disposed, exterior translucent or transparent lower panel generally designated 20 which terminates at its upper edge substantially coterminous with the horizontal portion of the mounting frame 12.

Referring now to the mounting frame 12, this portion includes an exterior or forward transverse brace 22, and a rearward transverse brace 24. The forward or front one of these braces 22 is held in place on its opposed sides by a pair of generally vertically extending braces 26, 28 or uprights, each of which includes an uppermost offset portion 30, 32. The remainder or downwardly extending portion of the uprights or vertical braces 26, 28 may be curved to accommodate the contours of the lower, forward panel 20.

Figure 2:
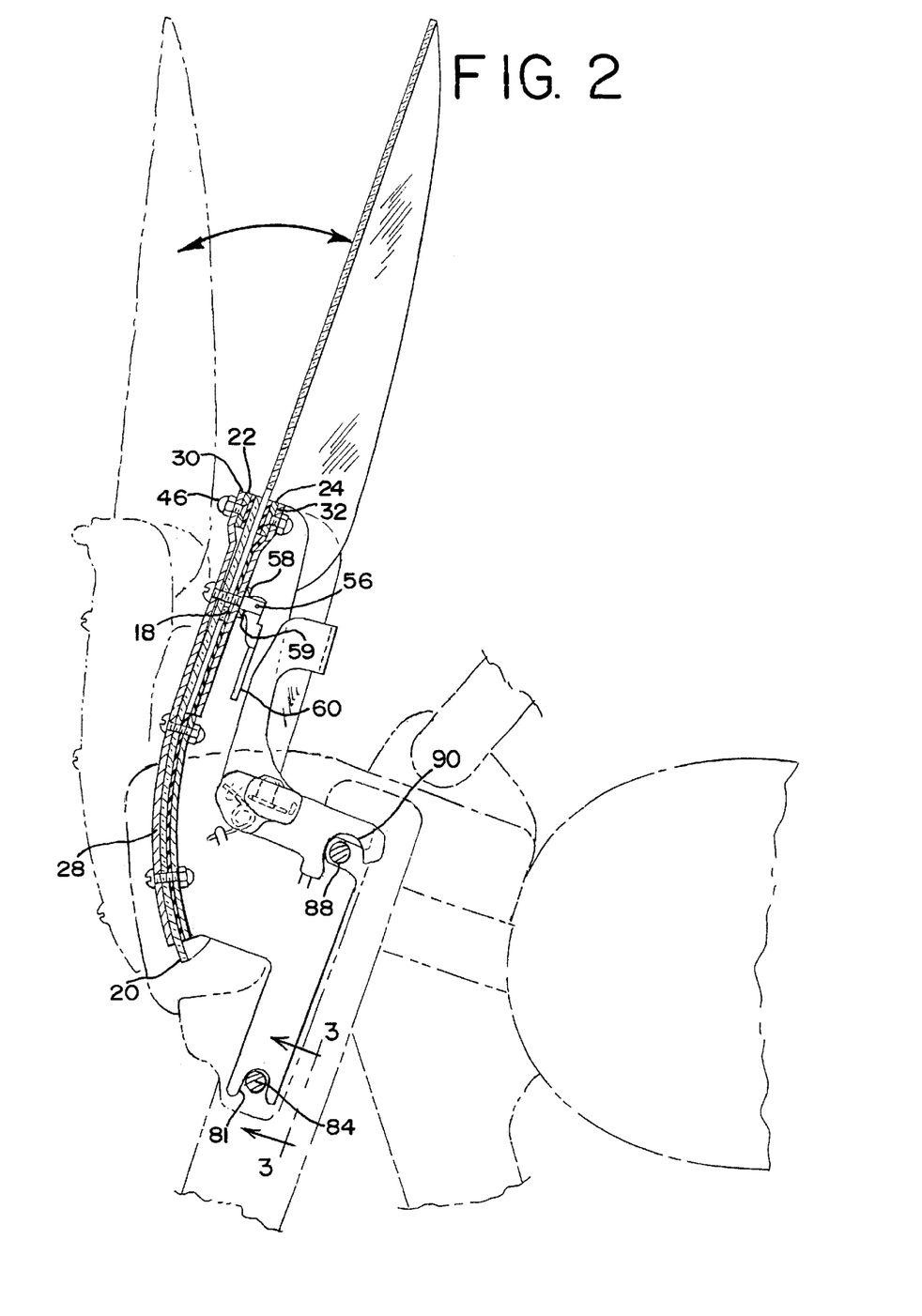
FIG. 2 is a, vertical sectional view, illustrating the attachment of the windshield of the invention
Figure 2A:
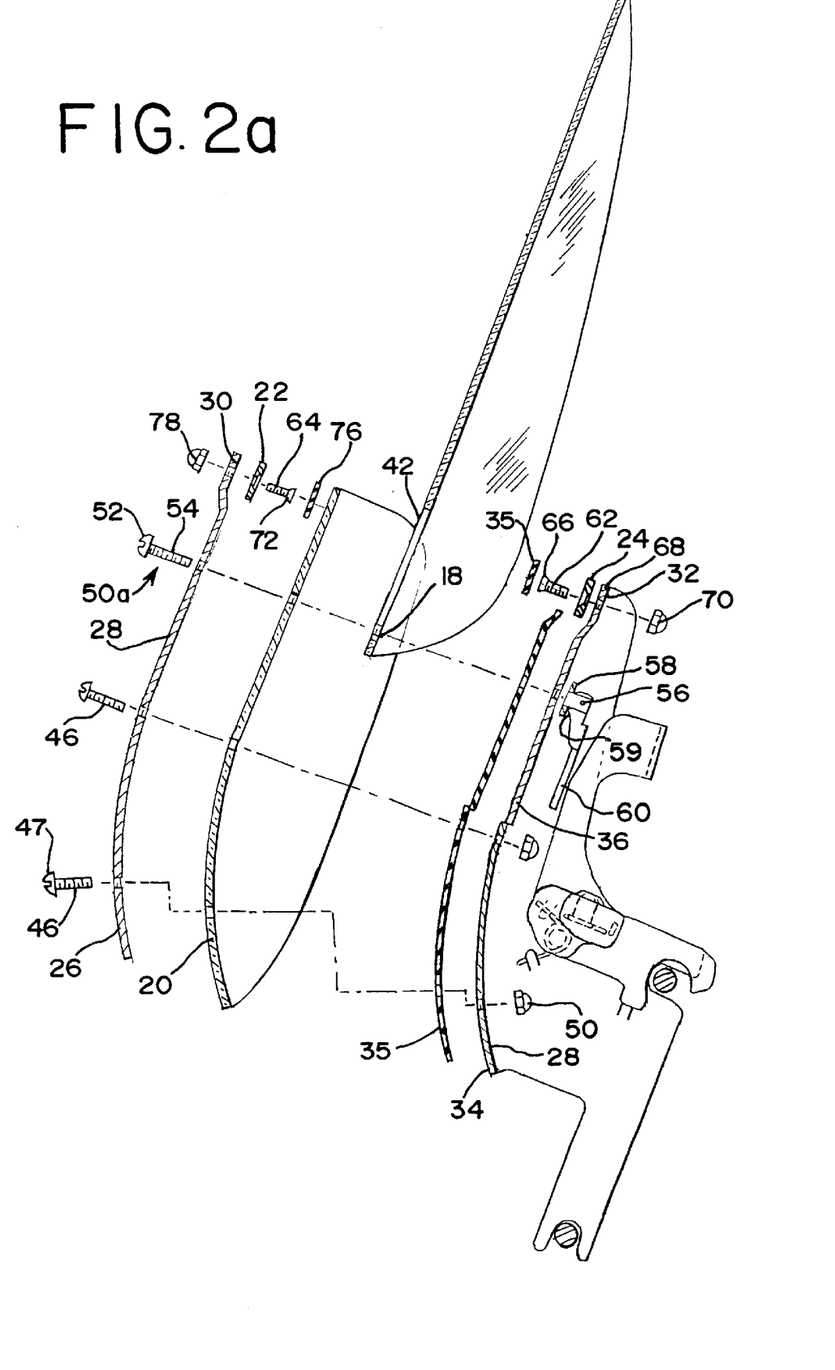
FIG. 2a is an exploded view of the shield of FIG. 2, showing details of loosening the shield so it can be adjusted vertically.
Figure 2B:
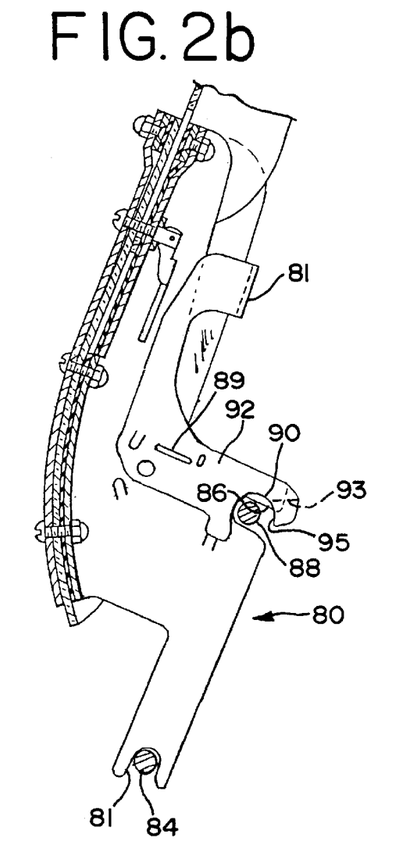
FIGS. 2b and 2c are fragmentary views, showing the latching and locking mechanism of the invention.
Figure 2C:
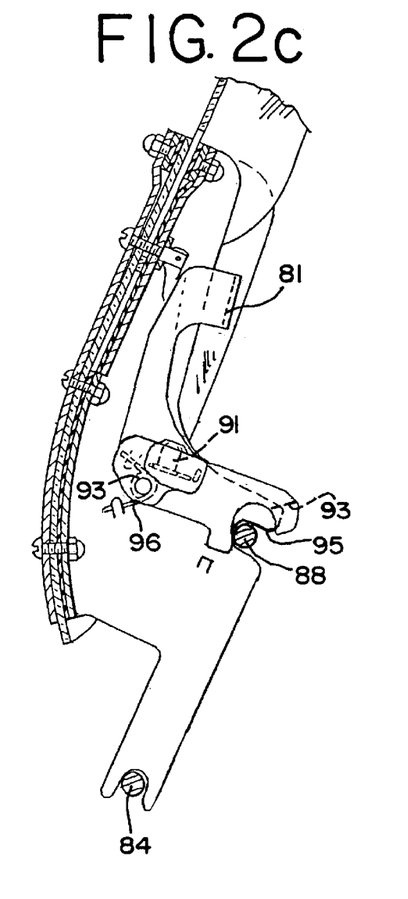
Figure 3:
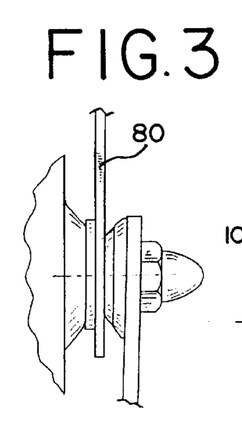
FIG. 3 is an assembled view of one attachment point of the invention.
Figure 3A:
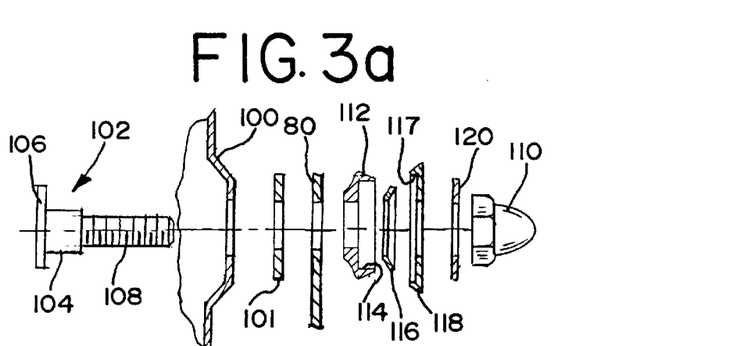
FIG. 3a is a fragmentary front view partly in elevation and partly in section, of one of the attachment points, showing the components for eliminating any side play in the mounting system and presenting a finished appearance.

Both of the windshield panels 20, 16, and particularly the lower extension portion 18 of the transparent panel 16 are held in place and sandwiched between the front and rear transverse braces 22, 24. The panels 16, 20 are also sandwiched between generally vertically extending braces 26, 28 on the front surface of the shield and two flanges (one of which 34 is shown in FIG. 2a) directly or indirectly supporting the rear of the shield 18, 20. The flanges 34 each contain an offset portion 36, to accommodate the increased width of both the lower extension portion 18 of the windshield and the forward shield 20. The upper, rearward transverse brace 24 is supported by a still further offset portion 68. The forward surface of the gasket 35 covering the rear transverse brace 24 has attached to it a segmented gasket strip 40, which allows room for the vertically extending slots 42 formed in the lower extension portion 18 of the windshield.

The shield assembly also includes various fasteners with different constructions and different purposes. A first set of fasteners 46 is intended to secure the lower shield 20 to its supporting brackets 34 and braces 26. These fasteners extend forward from the lower vertical flanges 34, through the gasket 35, through the lower portion of the forward panel 20 of the windshield, and through the vertically extending braces 26, 28. The heads of the fasteners 46 are slotted at one end 47 and have acorn nuts 50 on the other end in the preferred embodiment. Four of these fasteners 46, two on each side, are typically provided.

Optionally, one or more sets of spacers (not shown) may be provided for various pairs of fasteners to insure that the lower part 18 of the movable shield is not scratched as it moves up and down. These spacers would create sufficient clearance to provide for free movement.

Extending through an upper central part of the vertical flanges 36 and the vertically extending brace 26 is a variable force connector generally designated 50a, and this connector 50a releasably secures the first offset portion 36 and the gasket 35 to the front portion of the vertically extending braces 26, 28 through the lower windshield portion 20 and through the elongated vertical slots 42 of the lower shield extension 18. This connector or fastener, generally designated 50a, consists of a headed portion 52 and a square shank portion 54, with the end of the shank receiving a hole through which a pivot pin 56 is journaled. A force-applying washer 58 extends over the shank 54 of the fastener unit. The pin 56 secures a toggle mechanism consisting of one or more contoured cam surfaces 59, and a finger-engaging piece 60. When the finger-engaging piece is pivoted so as to lie flat and roughly parallel with the braces, the curvilinear cam surface 59 exerts a compressive force on the washer and a tensile force on the shank 54, pulling the head 52 toward the right as shown in FIG. 2.

Finally, there are plural pairs of separate fasteners 62, 64 each passing through respective components of the shield assembly 10. The first set of fasteners 62 is headed as at 66. It passes through the segmented gasket 35, and through the second offset 68 in the rear flange 34. It is fastened by an acorn nut 70 in this embodiment to the rear flange 34.

The upper portion of the lower windshield 20 is fastened to the transverse brace 22 and the forward vertical brace 26 by a fastener 64 which extends from the rear surface of the top of the lower portion 20 through the gasket 76, the transverse brace 22, and the offset 30 in the vertical brace 26, and terminates in an acorn nut 78. The head 72 of the fastener 64 and the head 66 of the fastener 62 are countersunk in the parts 22 and 35 so that the shield portion 18 may slide by. Likewise, the outermost lateral portions and the more central portions of the transverse brace 22 are also secured to the lower windshield 20 by similar fasteners 46 (FIG. 1).

Referring now to another feature of the invention, FIGS. 3, 3a, 4, 4a, 4b and best show the feature of the invention which resides in its ability to be attached to and removed from the cycle with the greatest of ease. Further, a lock is provided for securing the shield to the cycle against theft, once the shield is in place. According to this attachment feature of the invention, a pair of attachment points 82, 84 on each side are fastened by welding, for example, to the cycle. These fasteners could also be bolted to the cycle either directly or using suitable fittings.

When the windshield mounting brackets generally designated 80 are sought to be affixed, each of them is aligned with and brought into engagement between the generally vertically extending lower opening 81 and the lower attachment point 84. The bracket 80 is then pivoted into place, with the generally horizontal opening 86 engaging the attachment point 82. Subsequently, the opening 90 in the locking bracket 92 is retracted a short distance, and then released when the attachment point 82 is engaged.

Figures 4, 4A, 4B:
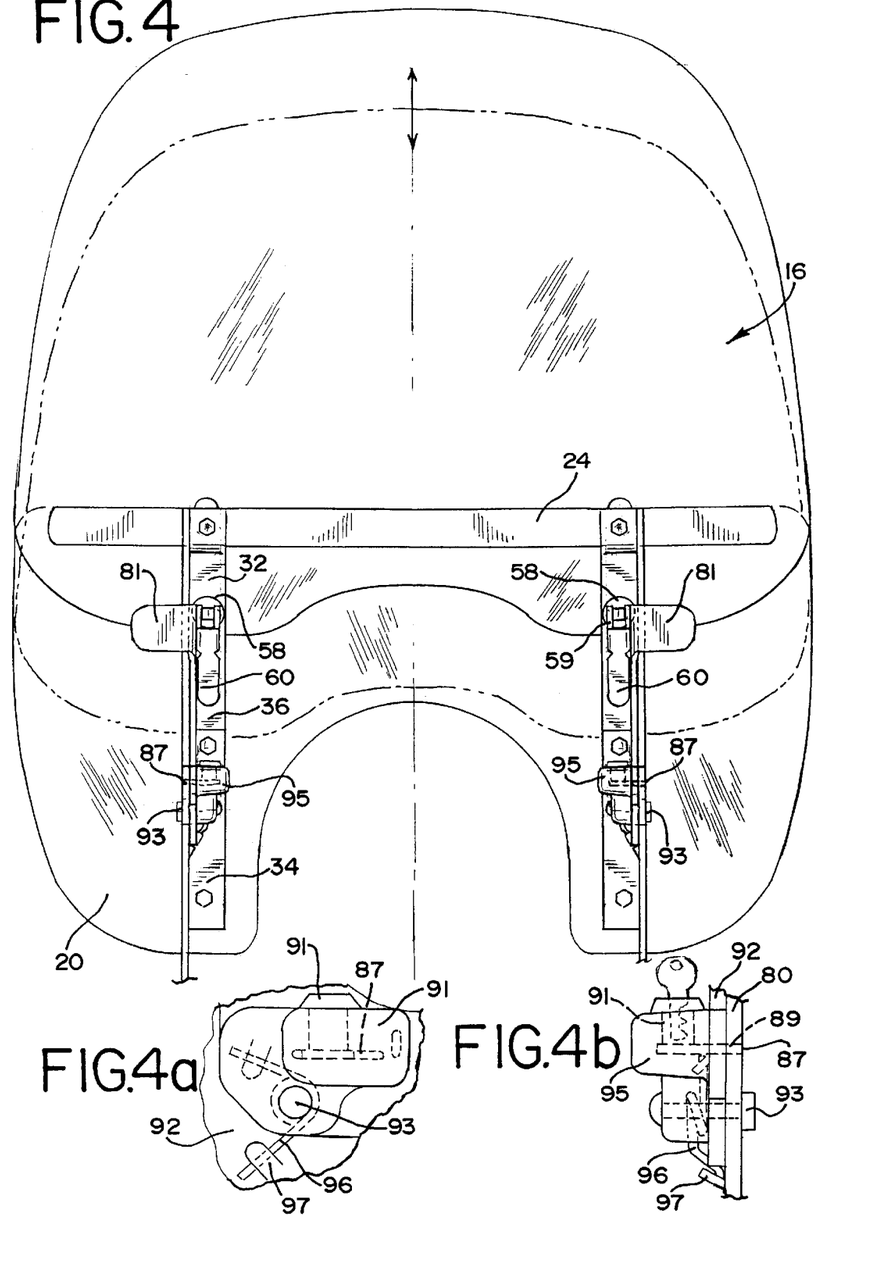

The simplest way to do this is by pushing the locking bracket 92 forward, preferably using the push bars 81 on the upper part of the vertical legs of the locking bracket. Once released, the locking bracket moves downward and locks over the upper attachment point 82. Tension on the locking bracket 92 is created by a spring 96, one end of which is contained within a housing 95. The housing contains most of the spring 96 and the pivot point 93 for the locking bracket 92, as well as a lock cylinder 91 (FIGS. 4, 4a, 4b). One end of the spring 96 rests against the knockout 97 and the other end against the housing. Another knockout 97a limits downward movement of the locking bracket 92.

The locking assembly in this embodiment is structurally attached to the locking bracket 92. The pivot pin 93 secures the lock housing 95 to the locking bracket 92. The housing covers all but the end portion of the spring, and encloses the lock cylinder 91. The tang 87 is attached securely to the lock cylinder 91.

The functioning of the lock is simple. It involves moving a portion such as the tang 87 through a pair of openings or slots 89, one cut through the mounting bracket and the other in the locking bracket 92. When these openings are registered, the tang fits through them, the brackets 80, 92 may not be moved, and the lock is secure.

Although not normally separable from the cycle, there are circumstances under which the shield may be desired to be detached, especially when struck by a very strong force from the rear. Two typical methods of addressing this problem are using frangible material, or parts of material, for the locking brackets, or making the bracket itself releasable.

The first approach is to make the locking bracket 92 from a material which will shatter, but only when acted on by force of, for example, 100–150 lbs. Thus, the bracket, or at least a part thereof, could be made from a very hard plastic material or a highly brittle metal material. Another way is to provide a line or area of weakness 93 (FIG. 2*a*) near the attachment point 88.

A second approach is to taper the nose portion 95 or latching claw of the opening in the locking bracket 92 so that, upon being struck forcibly, the nose portion or latching claw 95 will ride over the attachment point 82 and release itself. Under all but extreme forces, however, the brackets would remain locked together.

Referring now to the details of construction of the preferred form of attachment points, these are preferably arranged as shown in FIGS. 2 and 2*a*. Here, there is a boss or enlarged portion forming part of one of the mounting area 100. This surrounds and contains a sleeve generally designated 102 having a shank portion 104 and a flange 106. The shank portion 104 is hollow and closely surrounds a threaded fastener 108, which is welded or otherwise fixed to a fixed point and which extends through the various parts, terminating in the acorn nut 110.

There is preferably a washer 101 resting on the boss and then the mounting bracket 80 located between the washer 101 and a spring-loaded pressure nut 112. This nut 112 includes a cutout portion 114 for accommodating a Belleville washer 116, the other end of which bears on and is received within a bore or cutout portion 117 of the locating nut 118. This nut 118, and the acorn nut 110, complemented by a gasket 120, securely locate the bracket 34 to the light mounting portion or other sturdy portion of the cycle.

When the bracket 80 is removed from the attachment points, the pressure nut 112 axially moves over adjacent the washer 101 on the boss 100.

When the bracket 80 is moved into position, the pressure nut 112 compresses the washer 116, and the assembly 112, 116 is compressed within the recess 117, thus allowing for the width of the bracket 80. Accordingly, this provides a secure way of mounting these units, as well as a "finished look" way of presenting the cycle with or without the brackets attached. Hence, removing the shield has no adverse effect on the appearance of the cycle.

Referring now to the operation of the apparatus of the invention, the windshield assembly 10 is placed on the motorcycle by aligning the lower mounting brackets 80 with the attachment points 84, 88. The mounting brackets 80 are then tilted backwardly while the locking brackets 92 are raised by pressing against the surfaces 81. When the mounting brackets are then registered, the surface 81 is released and the locking opening 90 rides over the attachment point 81, locking the assembly in place.

When it comes to adjusting the windshield, the mechanism affords the essence of simplicity. Here, the toggles 60 are actuated, moving them to a position parallel to the axis of the fastener 50*a*. This toggling action releases the pressure on the lower portion 18 of the windshield 16, freeing the same for the desired vertical movement. The slots 42 in the windshield enable the shield 16 to be raised or lowered, but not to come out of the space between the lower shield 20 on the one hand, and the gasket and flange 34 on the other hand.

Too much upward movement, and the bottom of the elongated slot or opening 42 is engaged by the fasteners 52, and a maximum downward movement of the lower portion 18 is limited by the provision of the offset in the flange 34. Grasping the two edges of the shield with a hand on each side of the shield and gently but firmly raising them to the desired position is all that is required. Thereupon, the shield is simply locked in place by moving the over-center toggle 60. Any subsequent adjustment is made simply and easily by moving the two toggles 60 and pulling upward or downward on the shield as desired, subsequently actuating the toggles to move them to the locked position.

Referring now to the locking, this action is the essence of simplicity. The locking cylinder 91 includes a tang 87 that is receivable in the openings or slots 89 provided for that purpose. With the tang 87 engaged in the slots, no freedom of movement is allowed; on the other hand, merely turning the cylinder lock 91 a quarter turn will release the lock and enable the windshield to be removed. Obviously, other types of locks may be selected, and the lock could readily be placed on the fixed rather than the movable portion of the apparatus. Many other parts may be interchanged, and there orientations reversed, without departing from the inventive concepts.

It will thus be seen that the present invention provides a lockable, detachable motorcycle windshield, and a windshield with a vertically movable portion, having a number of advantages and characteristics including those expressly point out here, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

I claim:

1. A windshield assembly comprising, in combination, a movable windshield panel, a fixed windshield panel and a fastening frame assembly, said movable windshield panel having at least an upper portion adapted to be seen through, and a lower portion integrally formed with said upper portion and including a pair of vertically elongated slots permitting said movable windshield panel to move vertically within said slots, and said fixed windshield panel being immovably secured with respect to said fastening frame assembly, said fastening frame assembly including a rearward portion having a rear generally horizontally extending transverse brace and a pair of vertically extending mounting brackets, said fastening frame assembly further having a forward portion including a front, generally horizontally extending transverse brace and a pair of forwardly disposed generally vertically extending braces, at least one lowermost fastener extending from each of said lower portions of said forwardly disposed vertically extending braces through said fixed panel and through said mounting brackets, intermediate fasteners extending from said front brace, through both said fixed panel and said slots in said movable panel and through said rear mounting brackets, said intermediate fasteners being movable from a locked position placing a compressive force on said fixed and movable windshield panels to a released position exerting substantially no compressive force on said windshield panels, and two sets of upper fasteners, said first set of upper fasteners extending from said fixed windshield panel to said front transverse brace and said vertically extending braces, and said second set of upper fasteners extending from said rear transverse brace to said rear mounting brackets, said sets of fasteners having their heads disposed so as to allow vertical movement of said movable panel when said compressive force is released.

2. An assembly as defined in claim 1, which further includes at least gasket lying between each of said rear mounting brackets and said fixed panel.

3. An assembly as defined in claim 1, wherein said at least one lowermost fastener comprises two lowermost fasteners.

4. An assembly as defined in claim 1, wherein said intermediate fasteners include a fastener with a head in the form of a cam and a handle portion attached to said cam, said handle portion being adapted to be manipulated so as to apply said compressive force.

5. An assembly as defined in claim 1, wherein said intermediate fastener comprises a shank and a head with a handle on one end portion and a cam surface on the other end portion, and which further includes a washer for distributing the force generated by said cam surface.

6. An assembly as defined in claim 1, wherein said apparatus further includes a plurality of pairs of fasteners extending from said fixed windshield panel through said front transverse brace.

7. A cycle windshield assembly unit that is adapted to be easily removed without tools and yet locked when in place, said windshield assembly comprising, in combination, a windshield panel through which a rider may view the road, and a supporting structure for said windshield panel, said supporting structure including a pair of mounting brackets each having a portion thereof secured to said windshield panel along a generally vertical axis, said mounting brackets each including a generally rearwardly and downwardly extending portion, said portions each including a downwardly opening re-entrant portion in the lower part of said mounting bracket for engaging a first pair of attachment points, a second pair of re-entrant portions extending generally horizontally near the central, rearward portion of said mounting bracket, and adapted to engage an upper pair of attachment points, and a pair of locking brackets movably attached to said mounting brackets, said locking brackets each having a horizontal leg portion with a re-entrant portion extending generally vertically upwardly and being adapted to move into and out of registration with said upper pair of attachment points, and to latch said windshield assembly in place against movement from said attachment points, and a vertical leg portion including a portion adapted to be engaged by hand for latching and release, at least one of said mounting bracket and said locking bracket having a lock including a movable portion engageable with an opening in said other bracket, whereby, when said locking bracket is moved into a position of registration with said attachment point, said opening is registered with said lock and said brackets may be locked in place.

8. An assembly as defined in claim 7, wherein said pair of locking brackets are pivotally attached to said mounting brackets.

9. An assembly as defined in claim 7, wherein said portion of said lock includes a tang that is movable into engagement within said opening.

10. An assembly as defined in claim 7, wherein said vertical leg of said locking bracket includes an uppermost portion having an angled bend therein to facilitate pulling out and pushing said bracket into position.

11. An assembly as defined in claim 7, wherein said attachment points include a fixed, given diameter fitting having a counterbore therein, a Belleville washer, and a pressure washer portion receivable within said counterbore and movable axially therein, said Belleville washer supplying a resistive axial force.

12. A motorcycle windshield assembly unit that is adapted to be easily removed without tools and yet locked when in place on said motorcycle, said windshield assembly comprising, in combination, a windshield panel through which a rider may view the road, and a supporting structure for said windshield panel, said structure including a pair of mounting brackets, with said mounting brackets each having a first opening therein directed along a first axis and a second opening directed approximately 90° from said first axis, a pair of locking brackets associated with and movably attached to said mounting brackets, said locking brackets each having an opening approximately parallel to said first axis, at least one of said locking brackets and said associated mounting bracket having affixed thereto a lock assembly including a housing and a movable portion, and the other of said associated mounting and locking brackets having a portion in said bracket for receiving said movable portion, whereby, when said brackets are latched to said motorcycle, said portion of said lock may engage and hold said associated pair of brackets together, thereby locking said windshield to said motorcycle.

13. An assembly as defined in claim 12, wherein said movable attachment between said locking brackets and said mounting brackets is a pivotal movement.

14. An assembly as defined in claim 12, wherein said at least one locking bracket and said associated mounting bracket comprises two locking brackets and two associated mounting brackets.

15. A motorcycle windshield assembly that is adapted to be easily removed without tools and yet locked when in place, said windshield assembly comprising, in combination, a windshield panel through which a rider may view the road, and a supporting structure for said windshield panel, said structure including a pair of mounting brackets, with said mounting brackets each having a first opening therein directed along a first axis and a second opening directed approximately 90° from said first axis, a pair of locking brackets movably attached to said mounting brackets, said locking brackets each having an opening approximately parallel to said first axis, whereby said mounting brackets may both be attached to fixed attachment points on a motorcycle, at least one of said locking brackets and said mounting brackets having affixed thereto a lock assembly including a housing and a movable portion, and the other of said mounting and locking brackets having a portion in said bracket for receiving said movable portion, whereby, when said mounting and locking brackets are latched to said cycle, said portion of said lock may engage and hold said pair of mounting and locking brackets together, thereby locking said windshield assembly to said motorcycle, and said locking bracket being able to be released from said attachment point upon being struck from the rear by a great force.

16. An assembly as defined in claim 15, wherein said locking brackets are made from a frangible material.

17. An assembly as defined in claim 15, wherein said locking brackets are made from a hard, brittle plastic material.

18. An assembly as defined in claim 15, wherein said locking brackets each have a relieved portion closely adjacent said attachment point, said relieved portion permitting said shield to be released from said cycle upon being struck by a strong force, but being unable to be released when struck by a slight force.

19. An assembly as defined in claim 15, wherein said locking bracket contains a line of weakness extending across said locking bracket between said attachment point and said pivotal attachment to said mounting bracket.

\* \* \* \* \*